Aug. 17, 1965     C. S. GIBBONS     3,200,897
HYDRAULIC WEIGHING SCALE
Filed March 13, 1964
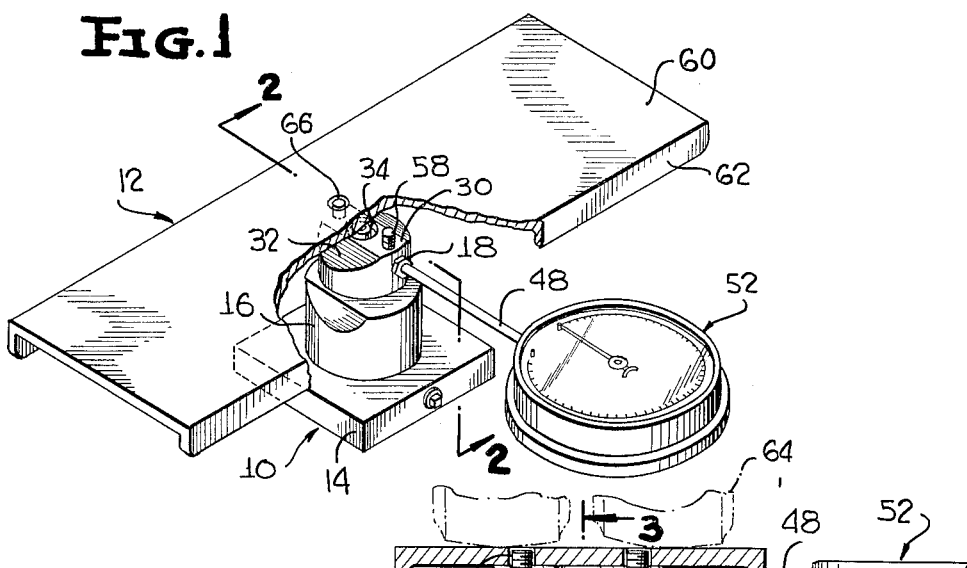
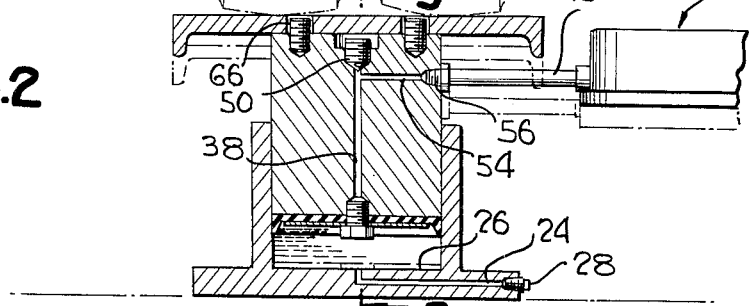
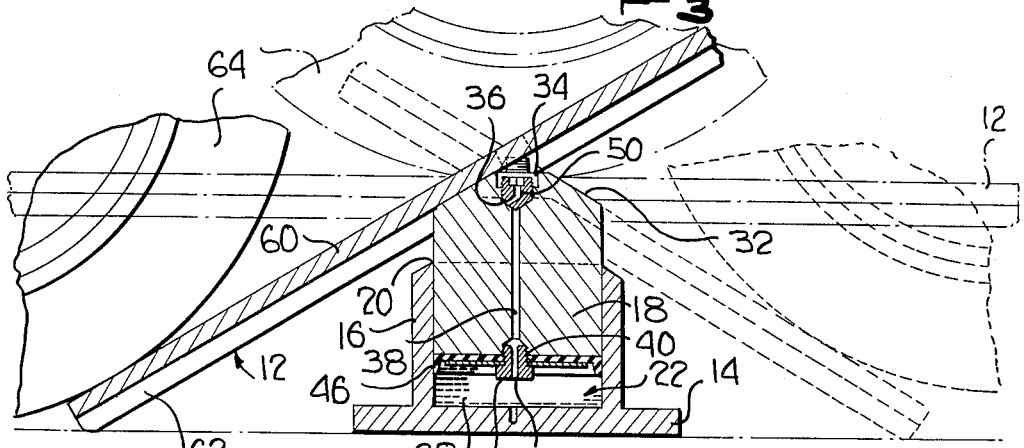
INVENTOR
CHESTER S. GIBBONS
BY *Shoemaker and Mattare*
ATTORNEYS

United States Patent Office 3,200,897
Patented Aug. 17, 1965

3,200,897
HYDRAULIC WEIGHING SCALE
Chester S. Gibbons, 158 W. Pulaski Road, Huntington Station, Long Island, N.Y.
Filed Mar. 13, 1964, Ser. No. 351,785
7 Claims. (Cl. 177—126)

This invention relates to improvements in weighing scales.

While the present invention is capable of being used for the quick, easy and accurate weighing of heavy bodies, it is designed primarily to facilitate the weighing of loaded vehicles, more particularly the large trailer truck type of vehicle used extensively in interstate commerce.

Under interstate commerce laws and regulations trailer trucks and other vehicles employed for carrying heavy loads over public highways are strictly regulated and controlled with regard to the amount of weight permitted to be carried by the front and rear axles of the truck. When interstate trucks are traveling loaded over public highways they must stop at designated weighing points where the truck wheels are run onto weighing scales which determine the amount of load carried by each wheel and particularly the front and rear axles of the truck. While the weight carried by rear axle of the truck may vary to a considerable extent under the regulations, there is a definite limit to the weight which the front axles of a truck is permitted to carry.

In light of the foregoing, it is a particular object of the present invention to provide a weighing device or scale which can be easily carried by the truck operator and by means of which a careful check can be kept upon the weight load carried by the front and rear axles of the truck as the truck is being loaded so that the danger of having the front end or front axle of the truck overloaded or greatly out of proportion to the load carried by the rear axle, can be avoided.

Another object of the invention is to provide a weighing scale which is designed so that the desired weight can be determined by running a wheel of the truck onto the scale platform which is in the nature of a ramp which levels off to a horizontal position when the truck wheel rides onto the middle portion thereof so that the weight of the load supported by that wheel can be readily seen upon an appropriate scale dial or indicator.

It is, of course, another object of the invention to provide a weighing scale of a character where two such structures can be used together to simultaneously support the entire front end or the entire rear end of a truck by positioning the right and left wheels of the front axle or the right and left wheels of the rear axle simultaneously upon a pair of scales.

A still further object of the invention is to provide a weighing scale which is entirely fluid actuated whereby employment of springs or pivoted balances is eliminated with the accompanying assurance that the scale will not become inaccurate or inoperative for any reason as a result of the development of fatigue in the springs or as a result of the wearing of pivots or knife edges of pivoted balance levers.

More specifically, the invention is directed to an improved hydraulic scale structure wherein a single massive fluid cylinder is provided having an open top into which a solid ram or piston is inserted to balance upon a noncompressible liquid in the cylinder, such as oil or the like.

Means is provided for leading the fluid off from the cylinder when a load is impressed upon the piston, and into a suitably calibrated fluid operated gauge.

The piston body is designed to have supported thereon a relatively long and wide platform forming ramp which is coupled to the top of the piston, midway between the ends of the ramp, whereby the ramp can have rocking motion to permit either end thereof to rest upon the ground so that a wheel can be run onto the ramp and to a position of rest upon the top of the piston and then run off from the opposite end of the ramp after the weighing operation is completed. The ramp is also loosely coupled with the top end of the piston so that it can be taken off and stored separately from the piston cylinder engage unit.

Other objects and advantages of the invention will become apparent as the description of the same proceeds and the invention will be best understood from a consideration of the following detailed description taken in connection with the accompanying drawing wherein:

FIGURE 1 is a view in perspective of a weighing scale constructed in accordance with the present invention, a portion of the structure being broken away to facilitate understanding the construction.

FIGURE 2 is a sectional view taken in a vertical plane substantially on the line 2—2 of FIGURE 1 and showing in broken lines the position to which the ramp platform and gauge may move under the weight of a truck wheel or truck wheels on the ramp.

FIGURE 3 is a sectional view taken in a vertical plane substantially on the line 3—3 of FIGURE 2 and showing a portion only of the ramp and also illustrating the three positions which the ramp may assume, the first position showing the ramp in full lines with a portion of a vehicle wheel, also in full lines, bearing thereon; the second position showing the ramp in horizontal weighing position and the ramp and wheel being in broken outline and the third position of the ramp showing the ramp rocked to the opposite position from the first described full line position and being shown with a portion of the motor vehicle wheel, in dotted lines.

Referring now more particularly to the drawing, it will be seen upon reference to FIGURE 1 that the illustrated weighing scale of the present invention embodies two separate units. These are designated 10 and 12 and the unit 10 comprises the main body portion of the scale structure while the unit 12 is the oscillatable ramp or platform.

The body unit 10 is preferably of heavy or massive construction whereby it is capable of carrying loads which may be as much as 30,000 pounds.

The unit 10 comprises the heavy base 14 upon which is mounted a vertical cylinder 16 which has a top thereof initially open to receive the solid piston body 18.

The initially open top of the cylinder 16 is designated 20 and as shown in FIGURES 2 and 3 the cylinder is of constant inside diameter from top to bottom and the solid piston body is also of constant overall diameter through the major portion of its length. Thus, the cylinder 16 provides a vertical circular chamber 22 and the diameter of the chamber and the outside diameter of the piston are relatively such that the piston has a very close or snug fit in the cylinder.

The base portion 14 of the unit 10 is provided with the fluid bore or passage 24, one end of which opens into the piston chamber through the floor 26 of the chamber while the other end of bore 24 opens through the outer side or outer edge of the base and is here shown as being closed by a removable plug 28.

The piston has a flat top surface 30 which is relatively narrow as compared with the overall diameter of the piston and which extends across the diameter of the piston in one direction. At opposite sides of the flat top surface 30 the piston is formed to provide the downwardly inclined shoulder surfaces 32. These surfaces are of approximately the same area and converge toward the top surface 30 as illustrated.

Formed in the top surface 30 in the center of the piston, is a shallow well 34 which has a conical bottom 36 and opening into the center of this bottom and extending downwardly through the axial center of the piston is a passage or bore 38.

The lower end of the bore 38 is enlarged and interiorally screw threaded as indicated at 40 and has threaded thereinto the cap screw 42 through which a fluid passage 44 is formed which communicates with the bore 38 as illustrated.

The cap screw 42 secures against the bottom surface of the piston, the cup washer 46 and the head of this screw projects below the plane of the bottom edge of the cup washer and is adapted to come to rest against the floor 26 of the piston cylinder to limit the downward movement of the piston in the event that a sufficiently heavy load is placed upon the top end of the piston to force it all the way down.

This screw head also has another function which is to protect the fluid lead off tube 48 as will be hereinafter more clearly set forth.

The well recess 34 is screw threaded to receive a needle valve 50 which normally closes the upper end of the bore 38 as shown but which is formed in a conventional manner to permit air to escape from the chamber if such should be trapped in the chamber with the oil or other fluid against which the piston bears. In other words, the valve 50 permits the bleeding of air from the cylinder which would otherwise interfer with obtaining an accurate reading on the indicator gauge since, as is well known, air is compressible whereas oil or similar fluid is not.

The numeral 52 designates a suitable pressure registering gauge adapted to be actuated by fluid under high pressure and this gauge is connected to the tube 48 which is threaded into the radially extending bore 54 formed in the piston and communicating at its inner end with the bore 38.

The gauge 52 is of a type which will register pressures of as much as 10,000 p.s.i. The dial of the gauge may be marked in any suitable manner to designate the weight supported by the piston as, for example, it may be marked to register pounds per square inch or it may carry figures to register the weight in pounds or in tons as may be desired.

The tube 48 supporting the gauge 52 may be of sufficient rigidity to support the gauge in the horizontal manner as shown. If desired, however, the tube may be attached to the outer end of the bore 24 by removing the plug 28 and threading the inner end portion 56 into the threaded end of the bore 24, the plug 28 then being used to close the outer end of the bore 54. The gauge may then rest upon the ground or other supporting surface as will be obvious.

Since the clearance between the top edge of the cylinder and the end of the tube 48 which is attached to the piston, is relatively small, the head of the cap screw 42 is gauged to strike the floor 26 of the cylinder and stop the downward movement of the piston before the attached end of the tube 48 can strike the top edge of the cylinder as is clearly shown in broken lines in FIGURE 2.

The top surface 30 of the piston has fixed therein the upstanding pins or studs 58 which are located on opposite sides of the well recess 34 each being adjacent to one end of the surface 30.

The unit 12 forms the platform for the scale and it also functions as a ramp as hereinbefore stated. As shown, this unit is in the form of a relatively long plate 60 having the longitudinal edge flanges 62. The unit 12 may consist of a suitable length of angle iron material and it should have a top width sufficient to receive thereon one or two tires of a dual wheel as shown in broken lines in FIGURE 2 where the lower portions of such wheel tires are designated 64.

Midway between its ends the plate body 60 is provided with the two transversely aligned spaced apertures 66 which are provided to loosely receive the pin members 58 so as to maintain the ramp unit against shifting or escape from the top of the piston but permit the free rocking of the unit in a vertical plane extending transversely of the surface 30 and also of the tube 48. Thus, the ramp can rock back and forth on the surface 30 and on the inclined shoulders 32 without danger of damaging the tube 48 and gauge 52.

The ramp body is of substantial length so that when it is rocked to one or the other of its extreme positions of inclination, one of which is shown in full lines in FIGURE 3, the end of the plate or the ends of the flanges 62 thereof will come to rest upon the ground or underlying surface and the under surface of the plate will bear upon an inclined shoulder 32 as is clearly illustrated in FIGURE 3.

As will be seen from the foregoing, when the piston chamber 22 is filled with oil or other suitable fluid, designated 68, and the platform ramp unit is placed in operative position as shown, a wheel of a truck may be run up on the ramp until the ramp oscillates to horizontal position whereupon the weight carried by the wheel will force the piston down and eject the fluid into the gauge 52 and thus register on the gauge the weight imposed on the piston and consequently the weight carried by the wheel resting on or supported by the piston.

Where it may be desired to take the weight of the entire rear end of the vehicle or the entire front end then two of the scale devices may be placed in position to have the two wheels on opposite sides of the vehicle run thereon or if desired use may be made of four of the scales so that the entire load may be weighed.

It is also possible to use two or four or more of the scale devices in a single fluid system by connecting tubes to each of the fluid discharge ports either 24 or 54 of either two or four or more of the scale devices and conveying the fluid to a single gauge which would thereby register the total weight on the vehicle axles.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A hydraulic scale, comprising a base, an upstanding cylinder thereon and having a top opening, a liquid in the cylinder, an upstanding piston supported by the liquid in and projecting through said top opening of said cylinder, a fluid actuated gauge, conduit means connecting the gauge with the interior of the cylinder below the piston for conveying liquid under pressure therefrom to the gauge, a platform, and means coupling the platform with the top portion of the piston for rocking movement in a vertical plane from a horizantal weighing position to either of two opposite inclined positions.

2. The invention as defined by claim 1, wherein said coupling means is adapted to permit removal of the platform from the top portion of the piston by merely lifting it from the piston.

3. The invention as defined by claim 1, wherein said platform is of materially greater length than width and functions as a vehicle wheel ramp in addition to its said function as a weighing platform and said coupling means is a loose fitting pin-in aperture coupling between the top of the piston and the platform.

4. A hydraulic scale, comprising a base, an upstanding fluid cylinder whereon, said cylinder being relatively short as compared to its diameter and forming an upwardly opening piston and liquid chamber of constant diameter throughout, a solid piston body fitting snugly in said chamber and having a top end projecting a substantial distance above the cylinder and having a flat top end surface portion bordered on opposite sides by inclined shoulders, a liquid in the chamber and supporting said piston, the piston having a bore extending axially therethrough and opening at the bottom end thereof into the chamber and opening at its top end through said top surface, a bleed valve closing the top end of the bore, a fluid pressure gauge, conduit means communicating with the chamber and connecting the latter with the gauge for leading liquid thereto under pressure from below the piston, a weighing platform adapted to be positioned on said top surface of the piston, and means for retaining the platform in said postion, said platform comprising a plate of substantial length extending transversely of said shoulders when positioned on said top surface of the piston, said last means forming a loose coupling between the plate and the piston permitting the plate to rock in a vertical plane from a horizontal weighing position on said piston top surface to either of two inclined ramp forming positions in which it bears upon a shoulder.

5. The invention as defined in claim 4 wherein the said loose coupling forming means comprises at least two studs upstanding from said top surface of the piston on opposite sides of the radial center thereof and engaging in openings formed in the plate.

6. A hydraulic scale, comprising a base, an upstanding fluid cylinder whereon, said cylinder being relatively short as compared to its diameter and forming an upwardly opening piston and liquid chamber of constant diameter throughout, a solid piston body fitting snugly in said chamber and having a top end projecting a substantial distance above the cylinder and having a flat top end surface portion bordered on opposite sides by inclined shoulders, a liquid in the chamber and supporting said piston, the piston having a bore extending axially therethrough and opening at the bottom end thereof into the chamber and opening at its top end through said top surface, a bleed valve closing the top end of the bore, a fluid pressure gauge, conduit means communicating with the chamber and connecting the latter with the gauge for leading liquid thereto under pressure from below the piston, a weighing platform adapted to be positioned on said top surface of the piston, and means for retaining the platform in said position, said conduit means including a bore formed radially in the piston body and communicating at one end with said axially extending bore and opening through the side of the piston body above the top of the cylinder.

7. The invention as defined in claim 6 with a cup washer positioned against the bottom end of the piston and peripherally engaging the wall of the cylinder, said axially extending bore being enlarged and screw threaded at its lower end, a tubular headed screw threaded into said enlarged lower end of the axially extending bore and securing said washer in operative position, and said screw having the head thereof projecting downwardly beyond the lowermost portion of the washer to engage the bottom of the chamber and limit the downward movement of the piston.

References Cited by the Examiner

UNITED STATES PATENTS

| 1,631,890 | 6/27 | Redick | 177—208 |
| 1,994,388 | 3/35 | Erichsen | 177—208 X |
| 3,017,939 | 1/62 | Vegors | 177—208 |

FOREIGN PATENTS

| 866,262 | 2/53 | Germany. |
| 212,075 | 3/24 | Great Britain. |
| 342,484 | 2/31 | Great Britain. |
| 28,546 | 3/03 | Switzerland. |

LEO SMILOW, *Primary Examiner.*